United States Patent [19]
Watanabe et al.

[11] Patent Number: 5,814,694
[45] Date of Patent: Sep. 29, 1998

[54] ANTI-REFLECTIVE COATING COMPOSITION

[75] Inventors: Satoshi Watanabe; Shigehiro Nagura; Toshinobu Ishihara, all of Kubiki, Japan

[73] Assignee: Shin-Etsu Chemical Co., Ltd., Tokyo, Japan

[21] Appl. No.: 833,052

[22] Filed: Apr. 3, 1997

[30] Foreign Application Priority Data

Apr. 15, 1996 [JP] Japan ................................ 8-117087

[51] Int. Cl.⁶ .................................................. C08K 5/09
[52] U.S. Cl. .................................... 524/238; 524/319
[58] Field of Search .............................. 524/319, 238

[56] References Cited

U.S. PATENT DOCUMENTS

| 4,491,628 | 1/1985 | Ito et al. ................................ | 430/176 |
| 5,310,619 | 5/1994 | Crivello et al. ....................... | 430/270 |

FOREIGN PATENT DOCUMENTS

| A-51-10775 | 1/1976 | Japan . |
| A-59-93448 | 5/1984 | Japan . |
| A-62-62520 | 3/1987 | Japan . |
| A-62-62521 | 3/1987 | Japan . |
| A-63-27829 | 2/1988 | Japan . |
| B2-2-27660 | 6/1990 | Japan . |
| A-5-188598 | 7/1993 | Japan . |
| A-6-118630 | 4/1994 | Japan . |
| A-6-148896 | 5/1994 | Japan . |
| A-8-15859 | 1/1996 | Japan . |

OTHER PUBLICATIONS

W. Hinsberg et al., "Journal of Photopolymer Science and Technology", vol. 6, Num. 4, pp. 535–546 (1993).

T. Kumada et al., "Study on Over–Top Coating of Positive Chemical Amplification Resists for KrF Excimer Laser Lithography", vol. 6, Num. 4 (1993).

Y. Hatakenaka et al., Proceedings of the 1994 Spring Conference of the Society of Applied Physics, p. 567.

*Primary Examiner*—Edward J. Cain
*Attorney, Agent, or Firm*—Oliff & Berridge, PLC

[57] ABSTRACT

A water-soluble coating composition for forming a layer to be placed on the upper surface of a resist is provided without use of Freons. The material includes an aqueous solution containing a) at least one water-soluble polymer selected from the group consisting of poly(N-vinylpyrrolidone) homopolymers and water-soluble copolymers of N-vinylpyrrolidone and other vinyl monomers, b) at least one fluorine-containing organic acid, and c) at least one amino acid derivative. The film formed through use of the material of the invention serves as both an anti-reflective film and a protective film. The material of the present invention provides a number of advantages in the formation of resist patterns, including excellent film-forming properties, excellent dimensional accuracy and aligning accuracy, simple and easy handling, high productivity, and good reproducibility.

5 Claims, 2 Drawing Sheets

ANTI-REFLECTIVE COATING COMPOSITION

BACKGROUND OF THE INVENTION

1. Field of the Invention

The present invention relates to a water-soluble coating composition for forming an anti-reflective film on a resist, and more particularly to a water-soluble coating composition which is suitable for forming a layer to be placed on the upper surface of a chemically amplified resist. The material of the invention is suitable for very fine processing techniques, as it exhibits enhanced sensitivity to high energy beams such as deep ultraviolet light, electron beams, and X-ray, and permits pattern-lithography through development with an aqueous alkali solution.

2. Description of the Related Art

As LSI's have become highly integrated and permitted increased operating speeds, more minute pattern rules are desired. Optical alignment currently employed as a general technique has been approaching the limit of resolution inherent to the wavelength of the light source. It is accepted that a pattern rule of approximately 0.5 micrometers represents a limiting value for optical alignment performed by use of a light source of g-line (436 nm) or i-line (365 nm). The level of integration of LSI's manufactured through use of such a pattern rule ends up with a 16M bit DRAM equivalent. Therefore, development of a technique that allows further minute rules is greatly needed.

Under the above-mentioned circumstances, deep ultraviolet lithography is considered a promising technology for a new generation of fine processing. Deep ultraviolet lithography permits processing of 0.3–0.4 micrometers. When a resist material exhibiting a low level of optical absorption is used, deep ultraviolet lithography enables formation of patterns made of walls that are almost perpendicular to the substrate. Moreover, in recent years, a technique employing a KrF excimer laser, which has an enhanced brightness, has become of interest as a light source for deep ultraviolet light. In order for this technique to be used in mass production, resist materials with low optical absorption and enhanced sensitivity are desired.

Chemically amplified resist materials that have recently been developed through use of an acid as a catalyst so as to meet the above-mentioned needs are particularly promising resist materials for deep ultraviolet lithography, exhibiting a number of excellent traits in terms of sensitivity, resolution, and resistance to dry etching (see, for example, Japanese Patent Publication (kokoku) No. 2-27660, Japanese Patent Application Laid-Open (kokai) No. 63-27829, U.S. Pat. No. 4,491,628, and U.S. Pat. No. 5,310,619).

However, deep ultraviolet lithography has a drawback in that processing into precise pattern sizes is difficult due to low dimensional accuracy of resist images, which is caused by standing waves attributed to use of light of a single wavelength, and when there are steps in the substrate, there occur effects of optical interference at the step portions where the film thickness varies, as well as halation from the step portions.

On the other hand, chemically amplified resist materials have the following shortcoming, which greatly hampers their being put into practical use. Namely, when lithography is performed with ultraviolet light, electron beams, or X-ray, chemically amplified resist materials cannot avoid causing a post exposure delay (PED) in the event that the standing time between exposure and PEB (post exposure bake) is prolonged. More specifically, taking the case of a positive resist as an example, the line pattern comes to have a T-top profile, or in other words, the upper part of the pattern becomes thick. This phenomenon makes size control difficult in the lithography step, which in turn adversely affects size control during processing of a substrate by dry etching [see, W. Hinsberg, et al., J. Photopolym. Sci. Technol., 6(4), 535–546 (1993); T. Kumada, et al., J. Photopolym. Sci. Technol., 6(4), 571–574 (1993); Hatanaka, et al., Proceedings of the 1994 Spring Conference of the Society of Applied Physics, page 567, 29p, MB-2].

It is considered that the problem of PED encountered when chemically amplified resist materials are used is caused by their dependence on the environment, more specifically, on basic materials in air. In the case of a positive resist, acid generated on the surface of a resist during exposure reacts with basic compounds in air and is deactivated. Therefore, if the standing time of the resist before PEB is prolonged, the amount of the deactivated acid is increased accordingly, to thereby retard decomposition of radicals that are unstable against acids on the surface of the resist. As a result, a slightly soluble layer is formed in the surface to thereby form T-top patterns.

A number of pattern forming methods have been proposed in attempts to overcome the above-mentioned problems occurring at the step portions of a substrate during deep ultraviolet lithography. Examples of such methods include a multi-layer resist method (Japanese Patent Application Laid-Open (kokai) No. 51-10775, etc.), an ARC method in which an anti-reflective film is formed on the lower surface of a resist (Japanese Patent Application Laid-Open (kokai) No. 59-93448), and an ARCOR method in which an anti-reflective film is formed on the upper surface of a resist (Japanese Patent Application Laid-Open (kokai) Nos. 62-62520, 62-62521, 5-188598, 6-118630, 6-148896, and 8-15859).

However, the multi-layer resist method requires an increased number of steps, as it forms a resist pattern, which serves as a mask, through offsetting of a pattern, after two or three resist layers have been formed. Thus, not only is the productivity of this method poor, but also dimensional accuracy is lowered due to reflection of light from the intermediate layer.

The ARC method, in which an anti-reflective film formed on the lower surface of a resist is subjected to etching, is disadvantageous in that it causes a significant decrease of dimensional accuracy, plus it has poor productivity attributed to an increased number of etching steps.

As compared to those two methods, the ARCOR method, in which an anti-reflective film is formed on the upper surface of a resist and the film is peeled off after exposure, is advantageous in that minute resist patterns with enhanced dimensional accuracy and alignment accuracy can be easily formed. In particular, Japanese Patent Application Laid-Open (kokai) No. 62-62520 discloses a method in which materials having a low index of refraction, such as perfluoroalkyl compounds led by perfluoroalkyl polyether and perfluoroalkyl amines, are used as an anti-reflective film, to thereby considerably reduce reflected light at the interface between the resist layer and the anti-reflective film. As a result, this method has satisfactorily reduced variation in a pattern size of a resist image to ⅓ that for the case in which a single resist layer is used. However, this method has the following shortcomings. First, perfluoroalkyl compounds have low solubility in organic solvents, and thus they need to be used after they are diluted with Freons or other liquid diluents in order to control the thickness of the film formed by coating. Second, Freons and similar materials are used as removers for removing the anti-reflective film of the above-mentioned perfluoroalkyl compounds. Presently, use of Freons has become an object of criticism from the viewpoint of environmental protection. In addition, the method described in Japanese Patent Application Laid-Open (kokai) No. 62-62520 has another drawback of including an increased number of process steps.

Japanese Patent Application Laid-Open (kokai) No. 62-62521 discloses a method in which a water-soluble polysaccharide is used as an anti-reflective coating composition, to thereby prevent intermixing occurrable at the interface between the resist and the anti-reflective film. It is claimed that the method is simple and easy and that the method is efficient from the viewpoint of process design, as the step of removing the anti-reflective film may also serve as a developing step. However, since the index of refraction of polysaccharides is higher than that of perfluoroalkyl compounds, this method is not satisfactory as it suppresses the range of variation in pattern size to only ⅔ the range when solely a resist layer is used.

According to the method described in Japanese Patent Application Laid-Open (kokai) No. 5-188598, the anti-reflective film is a binary system constructed of a film-forming polymer binder which is soluble or dispersible in water or in an aqueous alkali solution, and a fluorocarbon compound having a low index of refraction and which is soluble or dispersible in water or in an aqueous alkali solution. This film is effective as an anti-reflective coating composition for general-purpose resists formed of dinaphthoquinone compounds. However, since all the fluorocarbon compounds used in that publication are 100 mol % ammonium salts, when the anti-reflective coating composition is applied to chemically amplified resists, acids are deactivated on the surface of the chemically amplified resists, causing the aforementioned problem of PED.

Therefore, in the method described in Japanese Patent Application Laid-Open (kokai) No. 6-118630, there is used an anti-reflective coating composition containing not less than 90 wt. % of a water-soluble film-forming component and not more than 10 wt. % of a proton-generating substance, both figures being based on solid content. However, this anti-reflective coating composition, having a rather high index of refraction like the one described in the aforementioned Japanese Patent Application Laid-Open (kokai) No. 62-62521, is not satisfactory as an anti-reflective coating composition. Moreover, when water-soluble inorganic acids or organic acids that are mentioned as proton-generating substances are added in amounts equal to or greater than 10 wt. % with respect to solid content, pattern profiles are degraded due to an oversupply of acids. In addition, use of a weak acid ammonium salt as a proton-generating substance causes deactivation of acids on the surface of a chemically amplified resist. Therefore, the above-mentioned problem of PED cannot be solved.

Japanese Patent Application Laid-Open (kokai) No. 6-148896 describes a method which makes use of an anti-reflective coating composition constructed of a water-soluble film-forming component and a fluorine-containing surfactant. In the working examples, polyvinylpyrrolidone homopolymers are used as the water-soluble film-forming component, and fluorine-containing organic acid ammonium salts are used as the fluorine-containing surfactant. However, when anti-reflective coating compositions containing ammonium salts are used as anti-reflective coating compositions for chemically amplified resists, the problem of PED cannot be avoided, as is the case with the method described in Japanese Patent Application Laid-Open (kokai) No. 5-188598. Moreover, among the anti-reflective coating compositions used in the method of the above-mentioned publication, Japanese Patent Application Laid-Open (kokai) No. 6-148896, those that contain fluorine-containing organic acids (non-ammonium-salt-type fluorine-containing surfactants) as the fluorine-containing surfactant elevate the acidity of the resultant anti-reflective film. This causes a drawback of severe intermixing, and uneven coating results due to great surface tension and high bubble-forming properties.

According to the method described in Japanese Patent Application Laid-Open (kokai) No. 8-15859, the anti-reflective coating material is constructed of a water-soluble film-forming component and a salt of a fluorine-containing organic acid and alkanolamine. In the working examples, polyvinylpyrrolidone homopolymers are used as the water-soluble film-forming component. Also, alkanolamine is used in an amount of 100 mol % with respect to the weight of fluorine-containing organic acid ammonium salt. However, since alkanolamine, which is a basic substance, causes deactivation of acids on the surface of the chemically amplified resist, the resultant chemically amplified resist cannot avoid the aforementioned problem of PED, as is the case with the method described in Japanese Patent Application Laid-Open (kokai) No. 5-188598.

SUMMARY OF THE INVENTION

The present invention was accomplished in view of the foregoing situation. Accordingly, a general object of the present invention is to provide a material for forming a layer to be placed on the upper surface of a resist without use of Freons, the layer serving as an anti-reflective film that is easily formed, permitting formation of minute patterns with high dimensional accuracy and high alignment accuracy, being easily handled with enhanced productivity, being able to form resist patterns with elevated reproducibility, and also serving as a protective film based on the feature that it does not cause deactivation of acids on the surface of a chemically amplified resist, to thereby eliminate the above-mentioned problem of PED.

The present inventors have conducted careful studies, and have found that when a specific aqueous mixture is used as an anti-reflective coating composition for a layer to be placed on the upper surface of a resist, particularly a chemically amplified resist, it is possible to reduce the reflected light on the surface of a resist without causing a loss of incident light, and to greatly suppress, relative to the case of a single layer of resist, variation in pattern size attributed to multiple interference of light in the resist layer, and also to overcome the problem of PED. The aqueous mixture of the invention is characterized by 1) containing, as a water-soluble polymer, poly(N-vinylpyrrolidone) homopolymer and/or a water-soluble copolymer of N-vinylpyrrolidone and other vinyl monomers, and also containing a fluorine-containing organic acid that has excellent compatibility with such a water-soluble polymer, wherein the amount of the water-soluble polymer and the amount of the fluorine-containing organic acid are preferably not more than 70 wt. % and not less than 30 wt. %, respectively, with respect to solid content (i.e., the weight in total of the water-soluble polymer and the fluorine-containing organic acid), and 2) containing, in addition to the above components, an amino acid derivative which is effective in controlling the dissolution of the surface of the resist through decreasing the acidity of the anti-reflective film, which prevents deactivation of acids on the surface of a chemically amplified resist to thereby overcome the problem of PED, which reduces surface tension, or in other words reduces the angle of contact with the resist, and which has excellent defoaming properties, or in other words provides enhanced coating properties; wherein the amount of the amino acid derivative is not less than 10 mol % and is less than 100 mol % with respect to the amount of the fluorine-containing organic acid.

The present inventors have also found that the amino acid derivative, which is less basic than amine compounds or alkanolamine and which forms intramolecular salts, is effective in suppressing degradation of a resist profile causable by permeation of amine compounds or alkanolamine when these compounds are used; use of the amino acid derivative is advantageous in that the amino acid derivative does not permeate through the anti-reflective film to the resist even in the case of a prolonged time between coating of a resist film—anti-reflective film and exposure (hereinafter may be referred to as a holding time).

More specifically, the present inventors have found that when the above-mentioned aqueous mixture which contains a fluorine-containing organic acid (which has a low index of refraction), poly(N-vinylpyrrolidone) homopolymer and/or a water-soluble copolymer of N-vinylpyrrolidone and other vinyl monomers (which is a water-soluble polymer that is highly compatible with the fluorine-containing organic acid), and an amino acid derivative (which reduces intermixing and which has excellent coating properties) is used for the formation of an anti-reflective film (index of refraction: equal to or less than 1.55 at the wavelength of 248 nm) to be placed on the upper surface of a resist, the following advantages are obtained: The reflectance is greatly reduced, to thereby improve the dimensional accuracy of resist images; the variation in pattern size attributed to multiple light interference in the resist layer is suppressed to one half or less as compared to the case in which a resist layer is used solely; film-forming properties are excellent; intermixing at the interface between the resist and the anti-reflective film is reduced (dissolution control on the surface of the resist, plus prolonged holding time between coating and exposure); the process is convenient, as the step of removing the anti-reflective film may also serve as a developing step; working schedule is simple; no environmental problems are caused; the problem of PED is eliminated; and the film is also advantageously used as a protective film for a chemically amplified resist. The present invention was accomplished based on these findings.

Thus, in one aspect of the present invention, there is provided a water-soluble coating composition for forming a layer to be placed on the upper surface of a resist, comprising an aqueous solution containing:

a) at least one water-soluble polymer selected from the group consisting of poly(N-vinylpyrrolidone) homopolymers and water-soluble copolymers of N-vinylpyrrolidone and other vinyl monomers, b) at least one fluorine-containing organic acid, and c) at least one amino acid derivative.

Preferably, the amount of the amino acid derivative is not less than 10 mol % and is less than 100 mol % with respect to the amount of the fluorine-containing organic acid.

Particularly, the present invention is directed to a water-soluble coating composition, wherein the ratio by weight of the water-soluble polymer, i.e., a poly(N-vinylpyrrolidone) homopolymer and/or a water-soluble copolymer of N-vinylpyrrolidone and another vinyl monomer, is not more than 70 wt. % based on solid content, preferably 20–70 wt. %, and the ratio by weight of the fluorine-containing organic acid that has excellent solubility with the aforementioned water-soluble polymer is not less than 30 wt. % based on solid content, preferably 30–80 wt. %, and accordingly, the ratio by weight of the water-soluble polymer to the fluorine-containing organic acid is preferably between 20:80 and 70:30.

Preferably, the amount of the amino acid derivative is not less than 10 mol % and is less than 100 mol % with respect to the amount of the fluorine-containing organic acid.

The water-soluble coating composition of the present invention is advantageous when used for the formation of an anti-reflective film on the upper surface of a resist.

Particularly, the water-soluble coating composition of the present invention is advantageous when used for the formation of an anti-reflective and protective film on the upper surface of a chemically amplified resist.

The water-soluble coating composition of the present invention provides a film which, when placed on the upper surface of a resist (particularly a chemically amplified resist), serves as both an anti-reflective film and a protective film for the resist, which exhibits exellent film-forming properties, good dimensional accuracy, and good aligning properties. Thus, the water-soluble coating composition of the invention facilitates formation of resist patterns with enhanced productivity and reproducibility.

Accordingly, when the material of the present invention is used, very accurate minute processing can be performed on a rough surface of a substrate so as to form patterns thereon by photolithography in the manufacture of semiconductor integrated circuits.

DESCRIPTION OF THE PREFERRED EMBODIMENTS

Figure 1A:
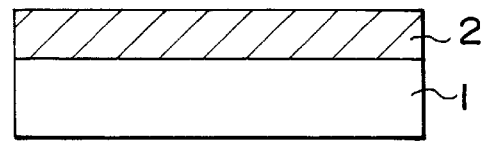
FIGS. 1A through 1D are schematic cross sections showing the process of lithography in which the anti-reflective coating composition of the present invention is used.

The present invention will next be described in more detail. The anti-reflective coating composition of the present invention contains a water-soluble polymer. The water-soluble polymer which is used in the invention is a poly(N-vinylpyrrolidone) homopolymer and/or a poly(N-vinylpyrrolidone) copolymer. Examples of the poly(N-vinylpyrrolidone) copolymer include N-vinylpyrrolidone/vinyl acetate copolymers, N-vinylpyrrolidone/vinyl alcohol copolymers, N-vinylpyrrolidone/acrylic acid copolymers, N-vinylpyrrolidone/methyl acrylate copolymers, N-vinylpyrrolidone/methacrylic acid copolymers, N-vinylpyrrolidone/methyl methacrylate copolymers, N-vinylpyrrolidone/maleic acid copolymers, N-vinylpyrrolidone/dimethyl maleate copolymers, N-vinylpyrrolidone/maleic anhydride copolymers, N-vinylpyrrolidone/itaconic acid copolymers, N-vinylpyrrolidone/methyl itaconic copolymers, and N-vinylpyrrolidone/itaconic anhydride copolymers. Particularly preferred water-soluble polymers are poly(N-vinylpyrrolidone) homopolymers and N-vinylpyrrolidone/vinyl acetate copolymers. These water-soluble polymers may be used singly or in combinations of two or more species.

The anti-reflective coating composition of the present invention also contains a fluorine-containing organic acid that has excellent compatibility with the aforementioned water-soluble polymers. Examples of the fluorine-containing organic acid which may be used in the present invention include, but are not limited to, the following compounds represented by any one of the following formulae (1) through (6):

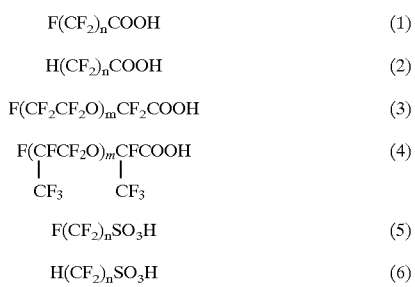

wherein n is a number from 4 to 15 inclusive, and m is a number from 1 to 10 inclusive. Preferably, n is from 6 to 10 inclusive, and m is from 2 to 4 inclusive. Examples of the fluorine-containing organic acid include perfluorovaleric acid, perfluorohexanoic acid, perfluoroheptanoic acid, perfluoroctanoic acid, perfluorononanic acid, perfluorodecanoic acid, 7H-dodecafluoroheptanoic acid, 9H-hexafluorononanic acid, 11H-eicosafluoroundecanoic acid, X-70-540-2 (a compound of formula (4) wherein m is 1, by Shin-etsu Chemical Co., Ltd.), X-70-540-3 (a compound of formula (4) wherein m is 2, by Shin-etsu Chemical Co., Ltd.), X-70-540-4 (a compound of formula (4) wherein m is 3, by Shin-etsu Chemical Co., Ltd.), and perfluoroctane sulfonic acid. Of these, particularly preferred are perfluorononanic acid and 9H-hexafluorononanic acid (both by Daikin Fine Chemical Laboratories), X-70-540-3 (a compound of formula (4) wherein m is 2, by Shin-etsu Chemical Co., Ltd.), and perfluoroctane sulfonic acid (by Mitsubishi Materials Corporation). These fluorine-containing organic acids may be used singly or in combinations of two or more species.

The anti-reflective coating composition of the present invention contains an amino acid derivative in a preferred amount of not less than 10 mol % and less than 100 mol % with respect to the amount of fluorine-containing organic acid. No particular limitation is imposed on the identity of the amino acid derivative which may be used in the present invention. For example, glycine, alanine, valine, leucine, isoleucine, proline, phenylalanine, tryptophan, methionine, serine, threonine, cysteine, tyrosine, asparagine, glutamine, aspartic acid, glutamic acid, lysine, arginine, histidine, 4-hydroxyproline, desmosine, gamma-aminobutyric acid, and beta-cyanoalanine may be used. The position at which the amino group is substituted is not particularly limited, and may be any of alpha-, beta-, or gamma-positions. The configuration of the amino acid derivative is not limited, either. Particularly preferred amino acid derivatives include glycine, DL-alpha-alanine, L-(−)-proline, DL-serine, L-arginine, and L-4-hydroxyproline. The amino acid derivative may be used singly or in combinations of two or more species.

The anti-reflective coating composition of the present invention is essentially an aqueous solution containing 20–70 wt. %, preferably 30–60 wt. %, based on solid content, of a water-soluble polymer (i.e., a poly(N-vinylpyrrolidone) homopolymer and/or a water-soluble copolymer of N-vinylpyrrolidone and another vinyl monomer) and 30–80 wt. %, preferably 40–70 wt. %, based on solid content, of a fluorine-containing organic acid (thus, the ratio by weight of the water-soluble polymer to the fluorine-containing organic acid is preferably between 20:80 and 70:30, and particularly preferably between 30:70 and 60:40), and further preferably not less than 10 mol % and less than 100 mol %, and more preferably 20–80 mol %, based on the amount of the fluorine-containing organic acid, of an amino acid derivative. The anti-reflective coating composition of the invention can be rotationally cast on a resist.

In the present invention, it is preferred that the poly(N-vinylpyrrolidone) homopolymer and/or a water-soluble copolymer of N-vinylpyrrolidone and another vinyl monomer be between 20 and 70 wt. % based on solid content. If the amount is less than 20 wt. %, sufficient compatibility and film-forming properties may not be obtained. On the other hand, if the amount is in excess of 70 wt. %, the index of refraction at the wavelength of 248 nm may become 1.55 or greater, to thereby reduce the anti-reflective effect.

The amount in total of the water-soluble polymer component and the fluorine-containing organic acid, or in other words solid content, of the anti-reflective coating composition of the present invention is preferably 1–30 wt. %, particularly preferably 2–15 wt. % with respect to the weight of the entirety of the anti-reflective coating composition, in order to make the thickness of the water-soluble film layer fall in the range of 300–3,000 angstroms (0.03–0.3 micrometers). If the amount is less than 1 wt. %, the film thickness may become smaller than 300 angstroms, to thereby exhibit insufficient anti-reflective and protective properties. On the other hand, if the amount is in excess of 30 wt. %, the film may come to have a thickness of greater than 3,000 angstroms, to thereby cause an increased operational burden during the peeling step.

In the present invention, it is preferred that the amount of the amino acid derivative be not less than 10 mol % and less than 100 mol % with respect to the amount of the fluorine-containing organic acid. If the amount of the amino acid derivative is less than 10 mol % with respect to the amount of the fluorine-containing organic acid, the surface of the resist may be severely dissolved. Moreover, film-forming properties may be degraded because the requirements of reduced surface tension and enhanced defoaming properties are not satisfied. On the other hand, the presence of the amino acid derivative in excess of 100 mol % may deactivate the acids on the surface of the chemically amplified resist, and in such a case, the problem of PED cannot be solved.

The anti-reflective coating composition of the present invention may be prepared by adding to water a predetermined amount of a poly(N-vinylpyrrolidone) homopolymer and/or a water-soluble copolymer of N-vinylpyrrolidone and another vinyl monomer, a predetermined amount of a fluorine-containing organic acid, and a predetermined amount of an amino acid derivative, and mixing the resultant aqueous system. Alternatively, a predetermined amount of a fluorine-containing organic acid and a predetermined amount of an amino acid derivative may be dissolved in an organic solvent such as ethanol, isopropanol, etc. and brought to dryness through evaporation, and the dry material may be mixed with a predetermined amount of a poly(N- vinylpyrrolidone) homopolymer and/or a water-soluble copolymer of N-vinylpyrrolidone and another vinyl monomer, to thereby prepare an aqueous solution.

In the present invention, in order to obtain an increased compatibility between the fluorine-containing organic acid and the poly(N-vinylpyrrolidone) homopolymer and/or a water-soluble copolymer of N-vinylpyrrolidone and another vinyl monomer, there may be incorporated an amide compound in such an amount that will not deactivate the acids on the surface of the chemically amplified resist, or in an amount of not more than 20 mol % with respect to the amount of the fluorine-containing organic acid. Examples of the amide compound include N-methylformamide, N,N-dimethylformamide, N-methylacetamide, N,N-dimethylacetamide, 2-pyrrolidinone, 1-methyl-2-pyrrolidinone, delta-valerolactone, and 1-methyl-2-piperidone.

The anti-reflective coating composition of the present invention may optionally contain, so long as the purposes of the invention are not impeded, a variety of alcoholic organic solvents, surfactants, and other additives in order to improve the characteristics of the resultant film.

The anti-reflective coating composition of the present invention, which is prepared by mixing the aforementioned components, is used for the formation of an anti-reflective film for general-purpose resists which contain diazonaphthoquinone compounds. Particularly, the film formed through use of the anti-reflective coating composition of the invention is advantageously used as an anti-reflective film and a protective film for chemically amplified resists.

In order to obtain a resist pattern by use of the anti-reflective coating composition of the present invention, known methods are used. For example, when a chemically amplified positive resist is formed, the steps of lithography shown in FIG. 1 may be used. First, a photo resist layer 2 is formed on a substrate 1 (e.g., a silicon wafer) by spin coating or a like method. Onto the resist layer 2 is applied the anti-reflective coating composition of the present invention by, for example, spin coating, to thereby form an anti-reflective film 3. The anti-reflective film 3 is exposed to UV light having a wavelength of 190–500 nm or excimer laser 4 so as to obtain a desired pattern profile through a demagnified projection method. Referring to FIG. 1C, portions indicated by A are exposed to light, and then are subjected to PEB (post exposure baking). Subsequently, the anti-reflective film 3 is removed by the application of water. Through development by use of a developing solution, a resist pattern 5 is formed. In the developing step, removal of the anti-reflective film 3 may be concurrently performed by use of an alkali developing solution.

The anti-reflective film preferably has a thickness of between 300 and 3,000 angstroms. In particular, in the case in which light having a wavelength of 248 nm is used for exposure, it is preferred that the thickness of the anti-reflective film be 400–440 angstroms, or three-fold or five-fold thickness of 400–440 angstroms.

Figure 2:
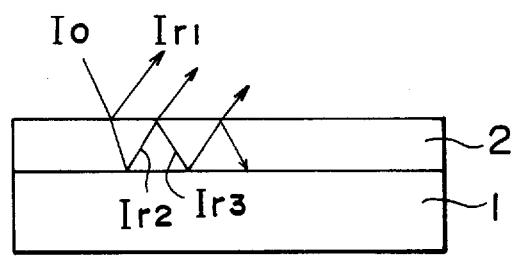
FIG. 2 is a schematic cross section showing scattering of light in the case in which a resist layer alone is provided on a substrate of the conventional art.
Figure 3:
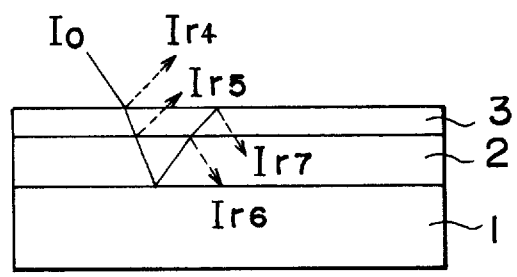
FIG. 3 a schematic cross section showing scattering of light in the case in which the anti-reflective film of the present invention is formed on a resist layer provided on a substrate.

Referring to FIGS. 2 and 3, the light scattering reducing effect of the water-soluble layer of the present invention which serves as an anti-reflective film will next be described.

As shown in FIG. 2, if solely a resist layer 2 is provided on a substrate 1, a significant amount of incident light $I_0$ is reflected at the interface between air and the resist ($I_{r1}$), to thereby cause a loss of incident light. In addition, multiple interference of light occurs in the resist layer, since the light entering the resist layer 2 is reflected at the interface between the resist and the substrate ($I_{r2}$) and the reflected light $I_{r2}$ is again reflected ($I_{r3}$) at the interface between the resist and air, and this phenomenon occurs repeatedly.

In contrast, when an anti-reflective film 3 is formed according to the present invention, the reflected light $I_{r4}$ of incident light $I_0$ at the interface between air and the anti-reflective film is lessened, the reflected light $I_{r5}$ at the interface between the anti-reflective film and the resist layer is lessened, the reflected light $I_{r6}$ at the interface between the resist layer and the anti-reflective film is lessened, and the reflected light $I_{r7}$ at the interface between the anti-reflective film and air is lessened. Thus, since the reflected light $I_{r4}$ and $I_{r5}$ is lessened, the loss of incident light is reduced. Also, since the reflected light $I_{r6}$ and $I_{r7}$ is lessened, multiple interference of light in the resist layer 2 is suppressed.

According to the theory of eliminating reflection, if the index of refraction of the light irradiated to a resist for exposure is n and the wavelength of the light is lambda, the reflectance (amplitude ratio) of the light for exposure decreases as the index of refraction n' and the thickness of an anti-reflective film approach $\sqrt{n}$ and (lambda/4n')×N (wherein N is an odd number), respectively. When a phenol resin material is used to prepare a chemically amplified resist, the index of refraction at 248 nm is approximately 1.78, whereas that of the water-soluble film of the present invention at 248 nm is not greater than 1.50. Moreover, in the case in which light having a wavelength of 248 nm (KrF excimer laser) is used, the optimum film thickness of an anti-reflective film is 400–440 angstroms, or three-fold or five-fold thickness of 400–440 angstroms. Therefore, when the anti-reflective film of the present invention is used under such conditions, the effect of reducing the aforementioned reflected light and multiple interference of light is exhibited perfectly.

The present invention will next be described by way of example, which should not be construed as limiting the invention.

1. Composition of Resist

A chemically amplified positive resist having the composition shown in Table 1 was prepared.

TABLE 1

| | |
|---|---|
| Polyhydroxystyrene in which the hydroxyl groups are partially protected with 1-ethoxyethyl groups | 75 parts by weight |
| Triphenylsulfonium trifluoromethane sulfonate | 5 parts by weight |
| 2,2'-Bis(4-tert-butoxycarbonyloxyphenyl)-propane | 20 parts by weight |
| Propylene glycol monomethylether acetate | 450–550 parts by weight |

2. Composition of Anti-reflective Coating Composition

The anti-reflective coating compositions employed had the compositions shown in Tables 2-1 and 2-2.

TABLE 2-1

(Embodiments of the Present Invention)

Anti-reflective coating composition

[In parentheses: proportions (unit: parts by weight)]

| No. | Water-soluble polymer | Fluorine-containing organic acid | Ultra-pure water | [In parentheses: proportions (unit: mol % 1))] | |
|---|---|---|---|---|---|
| | | | | Amino acid derivative | Additive |
| 1 | Luviskol K-90 (0.8) | EF-101 (1.6) | (97.6) | Glycine (40) | — |
| 2 | Luviskol K-90 (0.8) | EF-101 (1.6) | (97.6) | DL-Alpha-alanine (70) | — |
| 3 | Luviskol K-90 (0.8) | EF-101 (1.6) | (97.6) | L-(-)-Proline (60) | — |
| 4 | Luviskol K-90 (0.8) | EF-101 (1.6) | (97.6) | L-4-Hydroxyproline (60) | — |
| 5 | Luviskol K-90 (0.8) | EF-101 (1.6) | (97.6) | DL-Serine (50) | — |
| 6 | Luviskol K-90 (0.8) | EF-101 (1.6) | (97.6) | L-Arginine (25) | — |
| 7 | Luviskol K-90 (0.8) | EF-101 (1.6) | (97.6) | DL-Alpha-alanine (70) | 2-Pyrrolidinone (3) |
| 8 | Luviskol VA-64 (2.0) | C-5800 (1.3) | (96.7) | DL-Serine (50) | — |
| 9 | Luviskol VA-64 (1.3) | C-1800 (1.9) | (96.8) | DL-Serine (50) | — |
| 10 | Luviskol VA-64 (2.1) | X-70-540-3 (1.1) | (96.7) | DL-Serine (50) | — |

TABLE 2-2

(Comparative Examples)

Anti-reflective coating composition

[In parentheses: proportions (unit: parts by weight)]

| No. | Water-soluble polymer | Fluorine-containing organic acid | Ultra-pure water | [In parentheses: proportions (unit: mol % 1))] | |
|---|---|---|---|---|---|
| | | | | Amino acid derivative | Additive |
| 11 | Luviskol K-90 (0.8) | EF-101 (1.6) | (97.6) | — | — |
| 12 | Luviskol K-90 (0.8) | Solid matter of FC-93 (1.6) | (97.6) | — | — |
| 13 | Luviskol K-90 (0.8) | FC-93 (6.2) | (93.0) | — | — |
| 14 | Luviskol K-90 (0.8) | EF-101 (1.6) | (97.6) | — | Monoethanolamine (50) |
| 15 | Luviskol K-90 (0.8) | EF-101 (1.6) | (97.6) | — | Monoethanolamine (100) |

In Tables 2-1 and 2-2, the following should be noted.
1) The "mol %" figures are based on the fluorine-containing organic acid.
Luviskol VA-64: Copolymer of N-vinylpyrrolidone and vinyl acetate (6:4) (BASF Japan).
Luviskol K-90: Poly(N-vinylpyrrolidone) homopolymer (BASF Japan).
C-5800: 9H-Hexadecafluorononanoic acid (Daikin Fine Chemical Laboratories).
C-1800: Perfluorononanoic acid (Daikin Fine Chemical Laboratories).
X-70-540-3: Fluorine-containing organic acid of formula (4) in which m=2 (Shin'etsu Chemical Co., Ltd).
EF-101: Perfluoroctane sulfonic acid (Mitsubishi Materials Corporation).
FC-93: A solution of ammonium perfluoroalkylsulfonate (26%) in a solvent mixture of water (73%) and isopropyl alcohol (27%) (Minnesota Mining and Manufacturing Co.)

3. Exposure and its Assessment

A resist pattern was formed in accordance with the process shown in FIG. 1.

A chemically amplified positive resist was formed on a substrate 1 by spin coating, after which prebaking was performed at 110° C. for 90 seconds, to thereby form a resist layer 2 having a thickness between 0.6 and 0.8 micrometers (FIG. 1A).

Figure 1B:
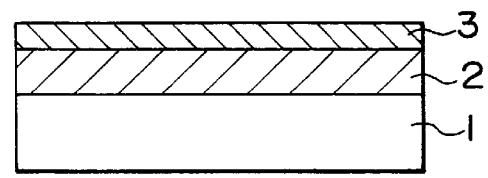
Figure 1C:
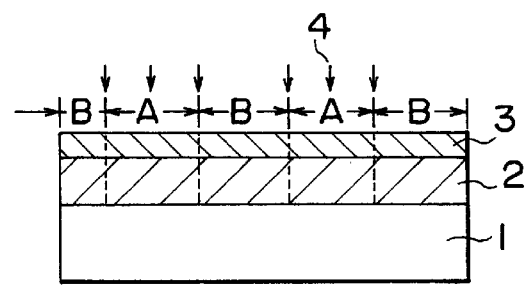

Subsequently, the resist layer 2 was spin-coated with the aforementioned water-soluble coating composition so as to form an anti-reflective film 3 having an optimum thickness of 400–440 angstroms (FIG. 1B).

Figure 1D:
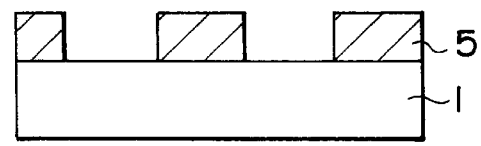

By use of an excimer laser stepper (NSR-2005 EX8A, Nikon Corporation, NA=0.5), a laser beam was irradiated for exposure (FIG. 1C) and then PEB was performed at 110° C. for 90 seconds. Through use of an aqueous 2.38% tetramethylammonium hydroxide solution, removal of the anti-reflective film 3 and a development process for 60 seconds were performed simultaneously, to thereby obtain a positive pattern (FIG. 1D).

The thus-obtained line-and-space resist pattern (pitch: 0.3 micrometers) was assessed with respect to dimensional variation. The assessment was also performed for the case in which the standing time between exposure and PEB was set to 1 hour. It is considered that the smaller the dimensional variation, the more excellent the anti-reflective film, as the absence of variation causes no deactivation of the acids on the surface of the chemically amplified resist, thereby solving the problem of PED.

Moreover, the resist was also assessed for dimensional variation in the case in which the standing time from coating and exposure was set to 48 hours. It is considered that the smaller the dimensional variation, the more excellent the anti-reflective film, as the absence of variation causes no deactivation of the acids on the surface of the chemically amplified resist, thereby solving the problem involved in holding during coating and exposure.

Dark erosion in thickness of the resist was also determined before and after PEB-development. The degree of the erosion is represented by the reduction of thickness (unit: angstrom). It is considered that the closer the value approaches the corresponding value that would be obtained in the case of a single resist layer (i.e., absence of an anti-reflective film), the better the anti-reflective film, thereby solving the problem of intermixing. In view that the permissible value for the dark erosion in thickness of a resist is desirably suppressed to not more than 3% the thickness of the resist, the anti-reflective coating composition preferably suppresses the reduction in thickness to not more than 3% of the target film thickness of 0.7 micrometers (=7,000 angstroms), i.e., not more than 210 angstroms.

4. Method for the Assessment of Coating Properties

Each anti-reflective coating composition (100 ml) was placed in a 100-ml vessel and shaken for 1 minute. After being allowed to stand for 1 hour, the material was applied by spin coating onto a 6-inch silicon wafer. The variation in thickness of the resultant film as well as the number of defects (so-called pin holes, which are very small areas in which film was not formed) were obtained for each wafer. Smaller variations in thickness of the film and smaller numbers of defects indicate better coating properties.

5. Results

The results obtained on the anti-reflective coating compositions having the compositions shown in Tables 2-1 and 2-2 are shown in Tables 3-1 and 3-2. Tables 3-1 and 3-2 also contain the results obtained for the cases in which solely a resist layer was present.

TABLE 3-1

(Examples of the Present Invention)

| Material No. | Index of refraction | Film thickness (angstrom) | Dimensional variation in the absence of PED (micrometers) | Dimensional variation after 1-hour PED (micrometers) | Dimensional variation after 48-hour holding between coating and exposure (micrometers) | Dark erosion of film thickness (angstrom) | Variation in film thickness for each sample (angstrom) | Number of defects | Angle of contact (degree) |
|---|---|---|---|---|---|---|---|---|---|
| 1 | 1.42 | 430 | ±0.015 | ±0.015 | ±0.015 | 180 | <20 | 0 | 40 |
| 2 | 1.42 | 430 | ±0.015 | ±0.015 | ±0.015 | 190 | <20 | 0 | 40 |
| 3 | 1.42 | 430 | ±0.015 | ±0.015 | ±0.015 | 190 | <20 | 0 | 40 |
| 4 | 1.42 | 430 | ±0.015 | ±0.015 | ±0.015 | 190 | <20 | 0 | 40 |
| 5 | 1.42 | 430 | ±0.015 | ±0.015 | ±0.015 | 190 | <20 | 0 | 40 |
| 6 | 1.42 | 430 | ±0.015 | ±0.015 | ±0.015 | 180 | <20 | 0 | 40 |
| 7 | 1.42 | 430 | ±0.015 | ±0.015 | ±0.015 | 180 | <20 | 0 | 39 |
| 8 | 1.51 | 410 | ±0.025 | ±0.025 | ±0.025 | 180 | <20 | 0 | 40 |
| 9 | 1.45 | 420 | ±0.020 | ±0.020 | ±0.025 | 180 | <20 | 0 | 40 |
| 10 | 1.54 | 400 | ±0.030 | ±0.030 | ±0.025 | 160 | <20 | 0 | 40 |

TABLE 3-2

(Comparative Examples)

| Material No. | Index of refraction | Film thickness (angstrom) | Dimensional variation in the absence of PED (micrometers) | Dimensional variation after 1-hour PED (micrometers) | Dimensional variation after 48-hour holding between coating and exposure (micrometers) | Dark erosion of film thickness (angstrom) | Variation in film thickness for each sample (angstrom) | Number of defects | Angle of contact (degree) |
|---|---|---|---|---|---|---|---|---|---|
| 11 | 1.42 | 430 | ±0.015 | N.D.[1] | N.D.[1] | 500 | >50 | 5–15 | 48 |
| 12 | 1.43 | 430 | ±0.018 | N.D.[2] | N.D.[2] | 160 | 30–50 | 5–15 | 46 |
| 13 | 1.43 | 430 | ±0.018 | N.D.[2] | N.D.[2] | 180 | 20–30 | 4–8 | 42 |
| 14 | 1.42 | 430 | ±0.015 | N.D.[2] | N.D.[2] | 200 | 20–30 | 4–8 | 42 |
| 15 | 1.42 | 430 | ±0.015 | N.D.[2] | N.D.[2] | 160 | 20–30 | 4–8 | 42 |
| Resist layer alone | | | ±0.050 | N.D.[3] | ±0.050[4] | 140 | — | — | — |

In Tables 3-1 and 3-2, the following should be noted.
[1] Because the surface of the resist was dissolved severely, the variation in film thickness was great and not reproducible.
[2] Since the surface of the layer was slightly soluble, a resist pattern of 0.3-micrometer line-and-spacing was not formed. The profile was a T-top shape.
[3] Since the surface of the layer was slightly soluble, a resist pattern of 0.3-micrometer line-and-spacing was not formed. The profile was a T-top shape.
[4] A slightly overhanging profile. Close to a T-top shape.

In this connection, anti-reflective coating composition Nos. 1 through 10 (examples of the present invention) had excellent square profiles. Also, the sample in which solely a resist layer was used and in which there was no PED was found good, exhibiting a square pattern profile.

The anti-reflective coating composition No. 11 (Comparative example) with no PED provided a round top profile and thus was not acceptable. The anti-reflective coating composition Nos. 12 and 13 (Comparative examples) with no PED provided a slightly T-top profile and were not acceptable.

As is apparent from Tables 3-1 and 3-2, the anti-reflective coating composition Nos. 1 through 10 (examples of the present invention), in contrast to the cases in which anti-reflective coating composition Nos. 11 through 15 were used or solely a resist layer was used (Comparative examples), no significant difference in dimensional variation was observed between the case in which PEB was performed immediately after exposure and the case in which PEB was performed after 1-hour standing following exposure. Moreover, there was observed only a small difference between the case in which PEB was performed immediately after exposure and the case in which PEB was performed after 48-hour standing following exposure. From these results, it is concluded that the anti-reflective coating composition Nos. 1 through 10 solved both the problem of PED and the problem involved with coating-exposure holding. It is also noted that in the anti-reflective coating composition Nos. 1 through 10 (examples of the present invention), the amount of reduction in film thickness is close to that in the case of the sole use of a resist layer, and is smaller than the permissible value. Thus, the anti-reflective coating composition Nos. 1 through 10 provide excellent films that overcome the problem of intermixing. In addition, the anti-reflective coating composition Nos. 1 through 10 (examples of the present invention) provide suppressed intraplane variation of film thickness and a reduced number of defects, demonstrating excellent coating properties; and the small values of the angle of contact indicate that the surface tension of the samples of the present invention is small.

The present invention is not limited to the above-described modes of embodiment, which are given for the purposes of illustration only. Various modifications and variations, so long as they are based on a technical concept substantially identical to that of the present invention and provide similar effects, are within the technical scope of the present invention.

What is claimed is:

1. A water-soluble coating composition for forming a layer to be placed on the upper surface of a resist, comprising an aqueous solution containing:

a) at least one water-soluble polymer selected from the group consisting of poly(N-vinylpyrrolidone) homopolymers and water-soluble copolymers of N-vinylpyrrolidone and other vinyl monomers, b) at least one fluorine-containing organic acid selected from the group consisting of the compounds of formulae (1) through (6):

$$F(CF_2)_2COOH \quad (1)$$

$$H(CF_2)_2COOH \quad (2)$$

$$F(CF_2CF_2O)_mCF_2COOH \quad (3)$$

$$F(CFCF_2O)_mCFCOOH \quad (4)$$
$$\phantom{F(CFCF_2O)_m}|\phantom{CFCOOH}|$$
$$\phantom{F(CFCF_2O)_m}CF_2\phantom{CFCO}CF_2$$

$$F(CF_2)_2SO_2H \quad (5)$$

$$H(CF_2)_2SO_2H \quad (6)$$

wherein n is an integer from 4 to 15 inclusive and m is an integer from 1 to 10 inclusive, and c) at least one amino acid derivative decreasing the acidity of the layer and preventing deactivation of acids on the surface of the resist.

2. A water-soluble coating composition according to claim 1, wherein the amount of the amino acid derivative is not less than 10 mol % and is less than 100 mol % with respect to the amount of the fluorine-containing organic acid.

3. A water-soluble coating composition according to claim 1, wherein the ratio by weight of the water-soluble polymer to the fluorine-containing organic acid is between 20:80 and 70:30.

4. A water-soluble coating composition according to claim 1, wherein the amount in total of the water-soluble polymer and the fluorine-containing organic acid is between 1 and 30% by weight with respect to the total weight of the material.

5. A water-soluble coating composition according to claim 1, wherein the resist is a chemically amplified resist.

* * * * *